US012616195B2

(12) United States Patent
Fuentealba Patino et al.

(10) Patent No.: US 12,616,195 B2
(45) Date of Patent: May 5, 2026

(54) CONJUGATES BETWEEN A BIOPOLYMER AND A PHOTOACTIVATED ANTIMICROBIAL AGENT FOR COMBATING FUNGAL DISEASES OF AGRICULTURAL INTEREST AND METHODS FOR PRODUCING SAID CONJUGATES

(71) Applicant: PONTIFICIA UNIVERSIDAD CATOLICA DE CHILE, Santiago (CL)

(72) Inventors: Denis Alberto Fuentealba Patino, Santiago (CL); Luciano Francesco Dibona Villanueva, Santiago (CL); Hector Antonio Valdes Gomez, Santiago (CL)

(73) Assignee: PONTIFICA UNIVERSIDAD CATOLICA DE CHILE, Santiago (CL)

( * ) Notice: Subject to any disclaimer, the term of this patent is extended or adjusted under 35 U.S.C. 154(b) by 982 days.

(21) Appl. No.: 17/784,797

(22) PCT Filed: Nov. 16, 2020

(86) PCT No.: PCT/CL2020/050154
§ 371 (c)(1),
(2) Date: Jun. 13, 2022

(87) PCT Pub. No.: WO2021/114003
PCT Pub. Date: Jun. 17, 2021

(65) Prior Publication Data
US 2023/0000075 A1 Jan. 5, 2023

(30) Foreign Application Priority Data
Dec. 12, 2019 (CL) .................................. 3654-2019

(51) Int. Cl.
| *A01N 25/10* | (2006.01) |
| *A01N 43/60* | (2006.01) |
| *A01N 43/90* | (2006.01) |
| *A01P 3/00* | (2006.01) |

(52) U.S. Cl.
CPC ............. *A01N 25/10* (2013.01); *A01N 43/60* (2013.01); *A01N 43/90* (2013.01); *A01P 3/00* (2021.08)

(58) Field of Classification Search
USPC .......................................................... 514/55
See application file for complete search history.

(56) References Cited

PUBLICATIONS

Chen et al., Photochemistry and Photobiology, 2012, vol. 88, pp. 570-576. (Year: 2012).*
Mesquita et al., Molecules, 2018, 23:2424, pp. 1-47. (Year: 2018).*
Chen, C. "Chitosan Nanoparticles for Antimicrobial Photodynamic Inactivation: Characterization and In Vitro Investigation." Photochemistry and Photobiology, 2012, 88; 570-576. DOI: 10.1111/j:1751-1097.2012.01101.x.
Feng, Y. "Photoactive antimicrobial nanomaterials." J. Mater. Chem. B. 2017;5: 8631. DOI: 10.1039/c7tb01869f.
Ghate, V. "Perspectives and Trends in the Application of Photodynamic Inactivation of Microbiological Food Safety." Comprehensive Reviews in Food Science and Food Safety. 2019, 18(2)9 (Publicado Jan. 15, 2019). DOI: 10.1111/1541-4337.12418.
Zhu, X. "Synthesis of thiolated chitosan and preparation nanoparticles with sodium alginate for ocular drug delivery. Molecular Vision." 2012; 18:1973-1982. ISSN 1090-0535/molvis.org/molvis/v18/a207.
Sasidharan, L. "Nanoparticles in Photodynamic Therapy." Chem. Rev. 2015. 115;4:1990-2042. DOI: 10.1021/cr5004198.
Mesquita, M. "Revisiting Current Photoactive Materials for Antimicrobial Photodynamic Therapy." Molecules 2018;23:2424. DOI: 10.3390/molecules23102424.
Dadoo, U. "Effect of chitosan/riboflavin modification on resin/dentin interface: Spectropic and microscopic investigations." Journal of biomedical materials research. Jul. 2013; 101a(7):1846-1856.
International Search Report in International Application No. PCT/CL2020/050154. Dated Mar. 3, 2021.

* cited by examiner

*Primary Examiner* — Traviss C McIntosh, III
(74) *Attorney, Agent, or Firm* — RAPHAEL BELLUM PLLC

(57) ABSTRACT

This invention relates to the field of control of different fungal diseases in the agricultural industry. Specifically, the invention reports conjugates between biopolymers and a photoactivable agent, which when activated by light generates singlet oxygen, a species known for its antimicrobial capacity. The invention also relates to methods of production of these conjugates and their uses.

17 Claims, 12 Drawing Sheets

Degree of deacetylation: 86%

FIG. 2

Dark (Osc)　　aPDT

Control

RF 72 µM

CH$_H$ 0.5%

CH$_H$/RF
(0.5%/ 72 µM)

CH$_H$-RF 0.5%

Photofungicidal activity

Percentages of *Penicillium digitatum* growth
obtained by radial growth measurement under
aPDT and dark treatments with RF systems.
*Plates treated with the CH$_H$-RF 0.5% system
showed no growth.

CONJUGATES BETWEEN A BIOPOLYMER AND A PHOTOACTIVATED ANTIMICROBIAL AGENT FOR COMBATING FUNGAL DISEASES OF AGRICULTURAL INTEREST AND METHODS FOR PRODUCING SAID CONJUGATES

FIELD OF INVENTION

The invention consists of a chemical formulation based on a biopolymer, a linker and a photoactive agent, which can be used for the biological control of different pathogens of agronomic interest. The method of application of this formulation is by means of an aerosol spray and by means of visible light irradiation the photoactive effects are activated, thus inhibiting the growth of fungi of the genera *Botrytis, Penicillium* and *Rhizopus*, by the generation of singlet oxygen.

BACKGROUND

Agriculture is the fundamental basis for the sustainability of food security on the planet, as it represents the main source of food and is part of the economy of developing countries. Demand for food has now increased, so there is a need to optimize agricultural production. To minimize losses in agricultural production, different biological control agents are used in order to minimize losses caused by different pathogens both pre- and post-harvest.

Two approaches to controlling post-harvest diseases have been described: The use and management of beneficial microflora that already exists in fruits and vegetable surfaces, or the introduction of artificial antagonists. The state of art teaches that methods to manipulate populations of microorganisms in a beneficial manner are not widely used due mainly to the limited knowledge of how these populations of microorganisms grow in the different food matrix. At present the most commonly used method of biological control is the use of different antagonists.

Within this approach the elimination or reduction of pathogenic microorganisms is typically carried out by surfactants, irradiation, exposure to solvents or exposure to agents that cause oxidative damage to biological macromolecules of microorganisms. These latter treatments include gases such as ethylene oxide and chlorine dioxide. In environments where humans are present, the use of gamma-ray or high-intensity UV radiation is undesirable, as is exposure of humans to organic solvents and harmful gases.

In addition, the use of biodegradable substances that do not harm the environment and are safe for human health is one of the challenges of both agriculture and the post-harvest fruit and vegetable industry. Poli-(BGA-AGA), also known generically as chitosan (although this name covers a wider family of biopolymer with different proportions between the monomers 2-amino-2-deoxi-D-glucopyranose and 2-acetamide-2-deoxi-D-glucopyranose), is a biopolymer formed from the organic or polymeric units (polymeric). of β(1-4)-2-acetamide-2-deoxy-D-glucose and monomers of β(1-4)-2-amino-2-deoxy-D-glucose, where the first monomer predominates the second in at least a 2:1 ratio. Selective interaction of Poli-(BGA-AGA) with trace metals inhibits toxin production and microbial growth.

Poli-(BGA-AGA) has antifungal and antibacterial activity that can be bactericidal or bacteriostatic, depending on the strains and the specific characteristics of Poli-(BGA-AGA). The antimicrobial activity of Poli-(BGA-AGA), is influenced by the nature and/or the physico-chemical structure of each polymer. Thus, the degree of deacetylation (GD) and the length of the molecule are related to the intensity of the antifungal action. In general, the higher Gd, the greater the antimicrobial capacity. In addition, the antimicrobial activity of Poli-(BGA-AGA) depends on some factors inherent to the substrate on which it acts, such as environmental conditions (temperature and humidity), nutrient composition, pH and water activity.

The use of Poli-(BGA-AGA) has reached a progressive and sustained interest in recent years, since its use prevents the accumulation of slowly degrading waste such as chitin. In addition, since Poli-(BGA-AGA) has antimicrobial properties, its application constitutes an alternative to synthetic chemicals for the conservation of edible fruits and vegetables.

On the other hand, the state of the technique teaches that certain compounds such as dyes, porphyrins, fluorescenes, phenothiaziniums and phthalocyanins generate high-energy singlet oxygen, a potent antimicrobial agent, when exposed to light and air. These materials are often referred to as "light-activated antimicrobial materials" (LAAM). However, in order for these LAAM compounds to exercise their antimicrobial activity, they have to be activated very close to the microorganisms against which they are desired to act. These are inefficient if there is not an appropriate method of addressing these agents to the cell walls of pathogenic microorganisms.

It has been described that one of the main problems suffered by fruit exporters is the scrap losses on arrival in the country of destination, and in the case of grapes it has been estimated that the percentage of loss reaches 15 percent. The main agent causing rejection in the exported grapes corresponds to the development of gray rot, caused by the fungus *Botrytis cinerea*. This fungus not only causes problems in grape production but also affects a number of economically important crops such as berries, tomatoes, pears, almonds, avocado, Etc. Although different compounds have been evaluated in terms of their activity against this fungus, there are currently no effective treatments. Additionally, fungi of the genus *Penicillium* and *Rhizopus* are important pathogens of different fruits and vegetables of great economic importance, such as citrus.

The problem of the technique is therefore to provide efficient products for the control of these pathogens in the post-harvest stage, and in particular there are no products on the market that efficiently direct antimicrobial agents to the cell walls of the white pathogenic microorganisms.

To assess the merits of the invention described in this document, a brief summary of the most relevant documents present in the technique is presented for the present invention. The search focused on documents related to antimicrobial formulations that inhibit the growth of pathogens of agronomic interest. More specifically, the search focused on formulations comprising chitosan and a photoactivable antimicrobial compound, to be used as an antimicrobial agent of pathogens of the genus *Penicillium, Botrytis* and *Rhizopus*. In general, the analysis carried out suggests that there is no formulation that can be used as an antimicrobial having the same characteristics, composition and/or excipients as compared to the formulation described in the present invention.

The document that may be considered the closest to the present invention is document WO2010017386A2, which teaches a composition comprising a light-activated antimicrobial material that has one or more singlet oxygen generating groups, it also includes a mediator polymer capable of bonding the microbial agent to a surface. However, the use of chitosan as a polymer is not mentioned, nor is the use of a composition to combat fungal infections such as *Botrytis, Penicillium* and *Rhizopus* described. Additionally, none of these documents describe that chitosan can be linked to a photoactivable antimicrobial agent, to surprisingly inhibit the growth of each of the microorganisms identified above.

In order to better illustrate the invention, this document describes the present invention considering some cases in which it may be applied, however, these examples should not be considered as limiting the invention.

BRIEF DESCRIPTION OF THE INVENTION

The invention describes a chemical formulation comprising a nanometer biopolymer, a linker and a photoactive agent, which are at a percentage of 1% in the formulation. The method of application of this formulation is by means of an aerosol atomizer and by means of visible light irradiation the photoactive effects of the compound are activated, thus inhibiting the growth of fungi of the genera *Botrytis, Penicillium* and *Rhizopus*, by the generation of oxygen singlet, chemical species known for its fungicidal activity.

DETAILED DESCRIPTION OF THE INVENTION

In a generally preferred realization the invention is a formulation comprising a biopolymer selected from the group consisting of chitosan, modified chitosan or its derivatives, polylysine or its derivatives, alginate, modified alginate or its derivatives, cellulose, modified cellulose or its derivatives, among others, and one or more photoactive antimicrobial agents.

In a specific realization the biopolymer is selected from chitosan, modified chitosan or its derivatives.

In a more specific performance, photoactive agents are selected from porphyrins, phthalocyanins, naphthalocyanins, chlorines, phenothiazines, achridines, bodipys, among others.

In another even more specific performance, photoactive agents are selected from rivoflavin and protoporphyrin.

In a preferred realization the invention describes two new chemical compounds called CH-RF and CH-PPIX. Both correspond to a chemical formulation based on two components: A photoactive or photosensitizing agent called Riboflavin (RF) or Protoporphyrin IX (PPIX) and Chitosan Polymer (CH), chemically conjugated through an isocyanate coupling agent of 4-maleimidophenyl (PMPI) or 1-ethyl-3-(3-dimethylaminopropyl)carbodiimide (EDC), respectively.

In a specific preferred realization the CH-RF formulation is presented as a yellow solid which is very soluble in water and dilute acid solutions.

The CH-PPIX formulation is presented as a purple solid, soluble in acidic solutions diluted with surfactants.

Both formulations take advantage of the fungicidal effect potential of the 2 components: CH, known for its fungicidal effect on agriculture and RF or PPIX for its action on antimicrobial photodynamic therapy (APDT).

A low molecular weight chitosan hydrolyzed by microwave treatment in the presence of salts is used to prepare both compounds.

The present invention additionally consists of a method of production of an antimicrobial compound comprising chitosan linked to riboflavin or protoporphyrin.

The conjugate production method involves the following steps: Biopolymer-Active Photo Agent Antimicrobial Compound (BP-FA) comprises the following 3 steps: (1) the photoactivable agent (FA) is conjugated with the PMPI coupling agent at 45° C. in nitrogen atmosphere for 24 h, obtaining the derivative FA-PMPI; (2) the previously hydrolyzed biopolymer (BP) is treated with thioglycolic acid, EDC and N-hydroxysuccinimide to anchor reactive thiol groups to the biopolymer (BP-SH); (3) Finally, the FA-PMPI derivative and BP-SH are reacted in aqueous solution at pH 6 for 24 hours. The product is then dialyzed and lyophilized for storage.

In a more specific preferred realization the production method uses the chitosan biopolymer and selected photoactivable agents of riboflavin and protoporphyrin IX.

The preparation of the CH-PPIX compound is done in one step: PPIX, EDC and CH are reacted in a mixture of 1% aqueous acetic acid (50%) and methanol (50%) for 24 h. The product is then precipitated with an ammonia:methanol 7:3 solution and dried in a stove at 30° C.

In another preferred realization, the formulation of the present invention contains between 0.1 and 5% chitosan.

In a more specific realization the formulation contains between 0.1% to 2.5% chitosan.

In another preferred realization, the formulation of the present invention contains between 0.1 and 15% riboflavin.

In a more specific realization the formulation contains between 0.1% to 1% riboflavin.

In another preferred realization, the formulation of the present invention contains between 0.1 and 5% protoporphyrin.

In a more specific realization the formulation contains between 0.1% to 1% of protoporphyrin.

In a specific realization, the formulation of the present invention consists of between 0.1 and 5.0% chitosan, between 0.1% and 5.0% of riboflavin or protoporphyrin.

In an even more specific realization, the formulation of the present invention consists of between 0.1 and 1.0% of chitosan, between 0.1% and 1.0% of riboflavin or protoporphyrin.

In a much more specific realization, the formulation of the present invention consists of 1.0% of chitosan and 1.0% of riboflavin or protoporphyrin.

In a preferred modality, the formulation of the present invention is used as an antimicrobial agent to control the growth of pathogens of fruits, vegetables and other foods.

In another preferred modality the formulation of this invention is used to combat infections caused by bacterial and fungal pathogens of different cultures of agronomic interest.

In a more specific preferred modality, the target pathogens of the formulation are selected from the genera *Penicillum, Botrytis* and *Rhizopus*.

In an even more specific modality the disease to be controlled by the formulation corresponds to the disease of gray rot (*B. cinerea*), green rot (*P. digitatum*) and soft rot (*Rhizopus stoloniser*).

BRIEF DESCRIPTION OF FIGURES

FIG. 2. Chemical formulae and synthesis conditions of the precursors of the biofungicide. The first equation shows the chitosan on the left, the reagents and conditions necessary for the reaction to the medium and the thiolated chitosan product on the right. The second equation is riboflavin derivatization with PMPI. To the left is the PMPI and riboflavin respectively, to the middle the catalyst and the conditions used and to the right the product RF-PMPI.

EXAMPLES

The following are examples of realization for this invention as described above:

Example 1

Preparation of Hydrolyzed Commercial Chitosan

Figure 1:
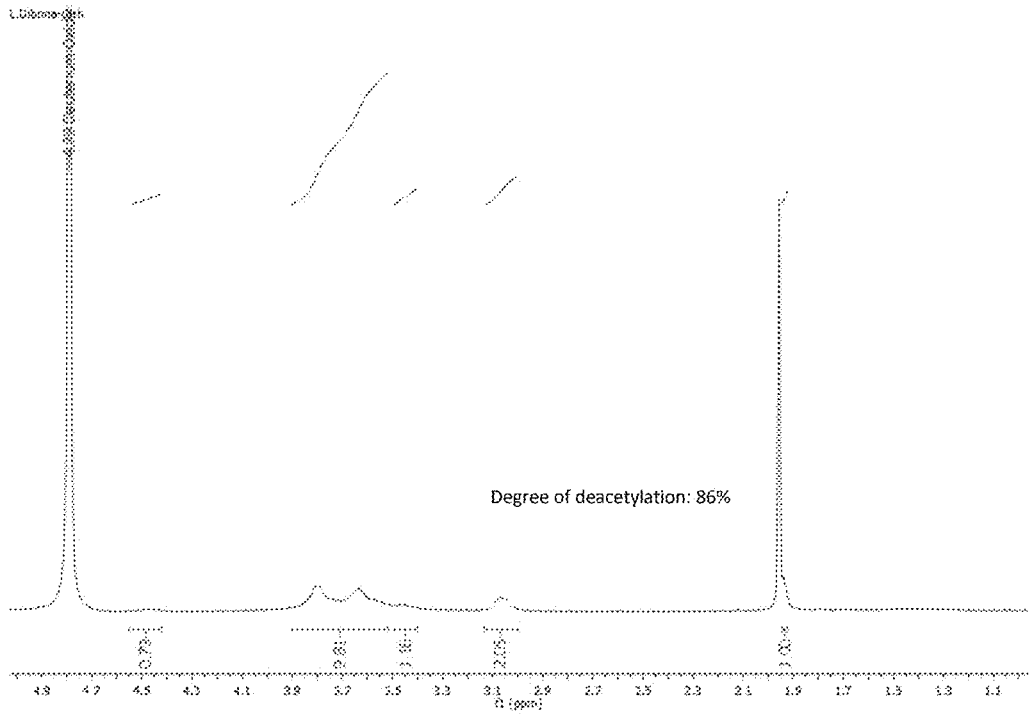
FIG. 1. Determination of the degree of deacetylation (GD) of hydrolyzed chitosan. Analysis performed by Nuclear Magnetic Resonance. GD determined by the ratio between the integration of signals between 4.5 to 3 ppm and the signal at 2 ppm.

A process of hydrolyzing the commercial chitosan used for the fungicide was carried out in order to improve its solubility and reactivity to subsequent processes. It has been observed that the degree of deacetylation of this is important for its biological properties, and therefore this parameter was evaluated. As shown in Table 1 and FIG. 1, it is observed that this polymer has a molecular weight of 2.4 kDa and a degree of deacetylation of 86%. Chitosan with this degree of deacetylation is the one that was used to produce the antimicrobial compounds described in the following examples.

Example 2

Synthesis and Characterization of Compounds with Antimicrobial Activity

Figure 2:
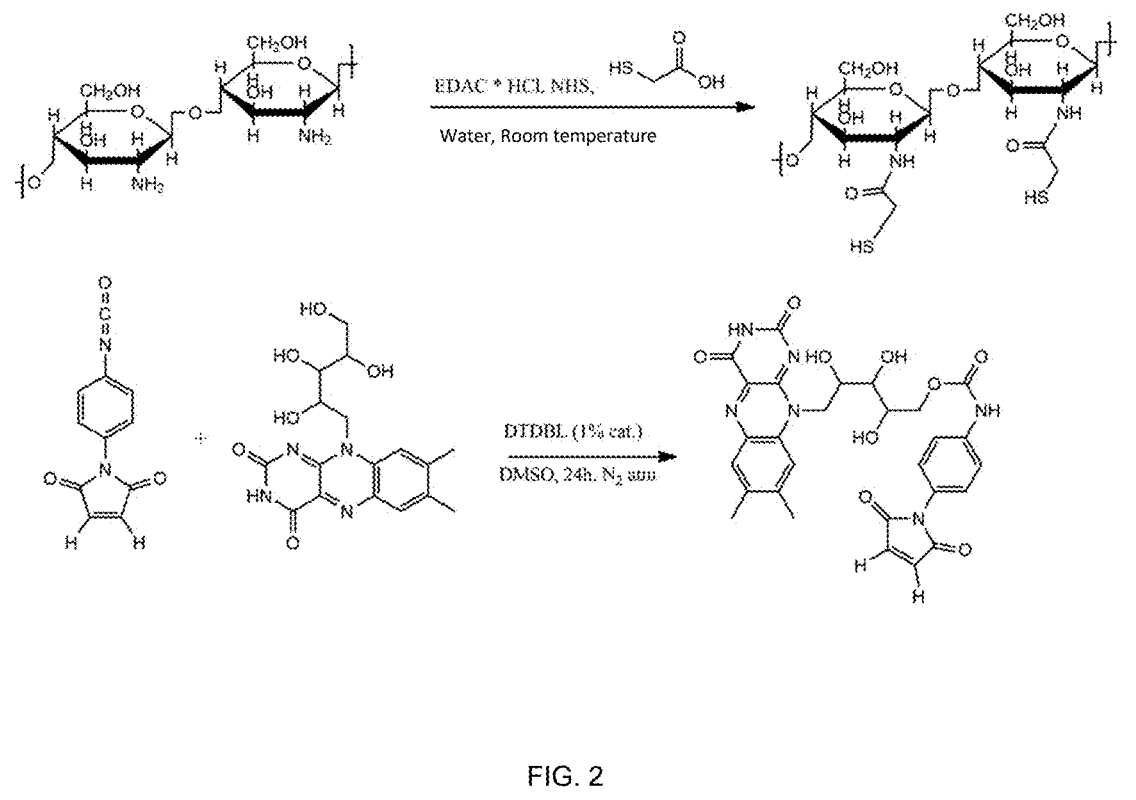

The synthesis conditions of the 2 precursors of the biofungicide molecule are presented in FIG. 2. These correspond to a riboflavin derivative (RF-PMPI), to which the coupling agent PMPI and thiolate chitosane (CH-SH) are incorporated. This prior preparation of the precursors is intended to give the conditions of reactivity between these 2 (RF-PMPI and CH-SH) to form the chemical conjugate between chitosane and riboflavin (CH-RF).

To obtain the pure precursor for chemical characterization and then its binding with chitosane, a separation was performed by preparative chromatography on board, the band in the middle of the plate corresponds to the RF-PMPI derivative, obtaining a

TABLE 1

Figure 3:
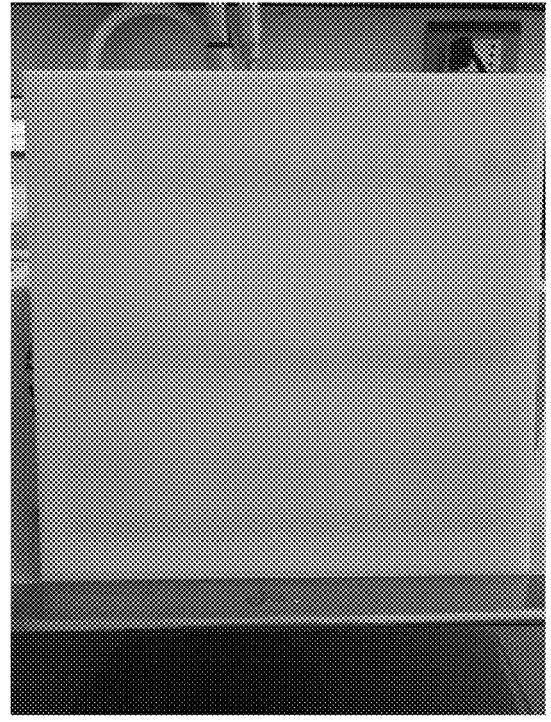
FIG. 3. Separation of RF-PMPI reaction mixture by preparative chromatography on board (eluent Acetate: Methanol 9:1). The lower fractions correspond to unreacted riboflavin, the central fraction corresponds to the RF-PMPI product and the upper fraction corresponds to unreacted PMPI and the DBTDL catalyst.

| | | | | | | | | |
|---|---|---|---|---|---|---|---|---|
| | | | Characterization of commercial chitosan and hydrolyzed chitosan | | | | | |
| System | t (s) | nr | nsp | [n] | Mv g/mol | c g/mL | α | K |
| CH | 132 | 5.07 | 4.07 | 3.69E+04 | 39585 | 6.0E–05 | 0.96 | 1.424 |
| $CH_H$ | 51 | 1.96 | 0.96 | 2.53E+03 | 2426 | 3.0E–04 | — | — |
| Solvent | 26 | — | — | — | — | — | — | — | successful separation (FIG. 3).

Figure 4:
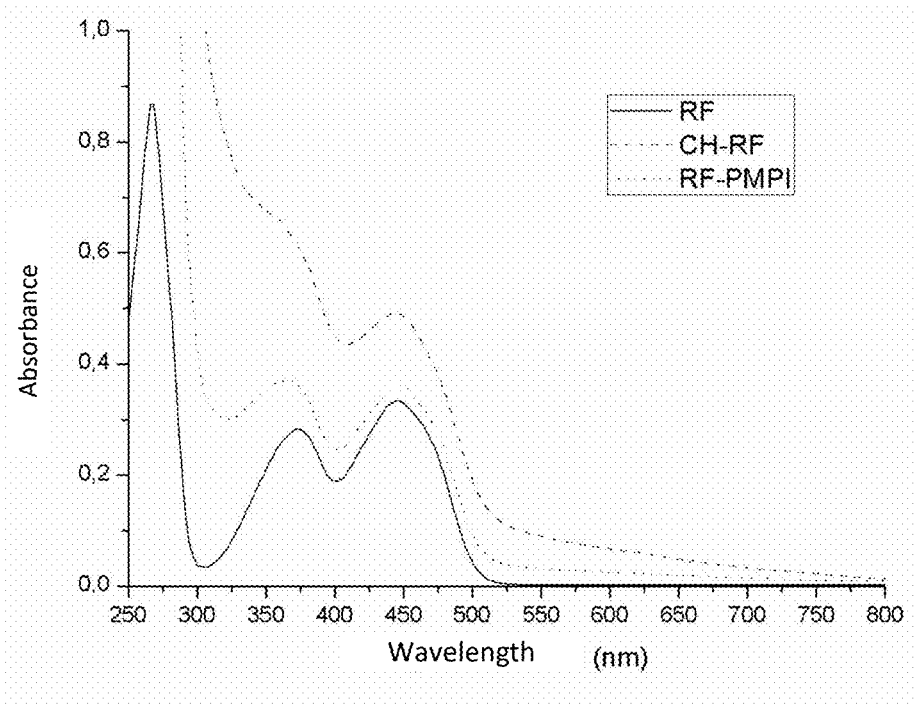
FIG. 4. UV-visible absorption spectra from Riboflavin-based systems. Diluted RF and RF-PMPI from DMSO solution to aqueous solution and CH-RF in aqueous solution. Spectra measured at room temperature. Solid line: RF, Dashed Line: CH-RF. Scored Line: RF-PMPI. $\lambda_{max}$ absorption at 450 nm in all cases.
Figure 5:
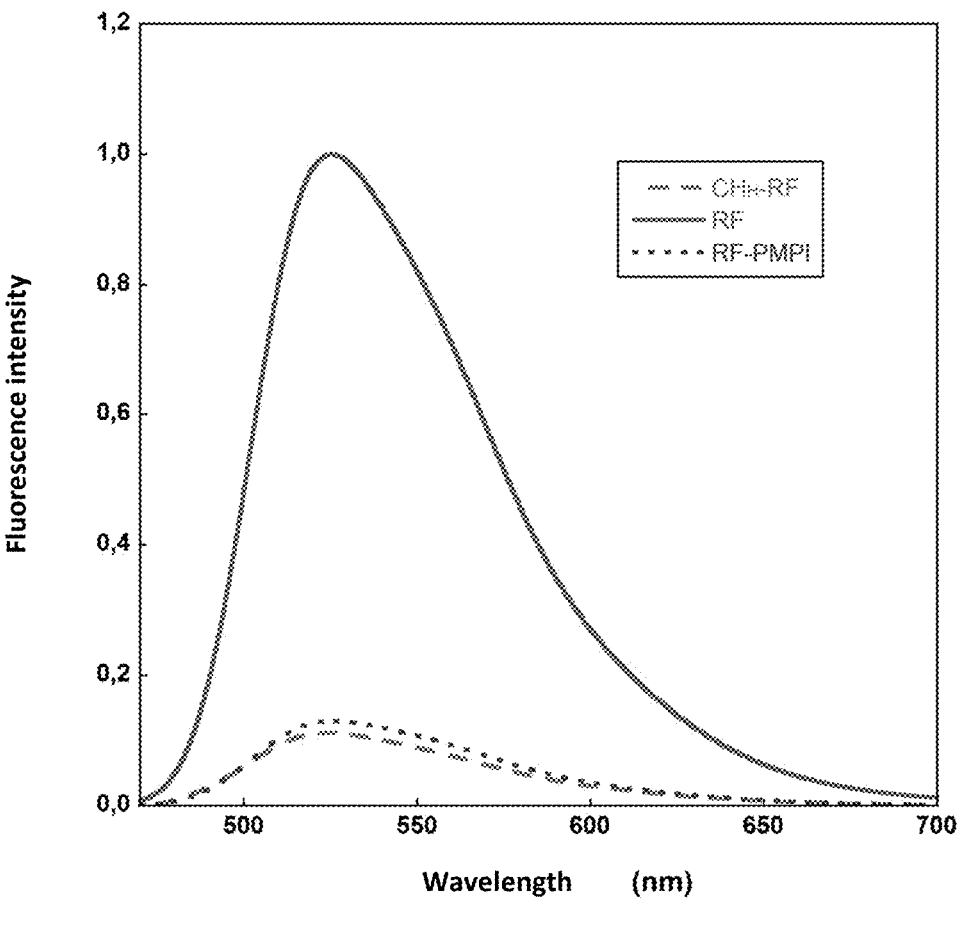
FIG. 5. Emission spectra from Riboflavin-based systems. Diluted RF and RF-PMPI from DMSO solution to aqueous solution and CH-RF in aqueous solution. Spectra obtained with an excitation λ of 450 nm. $\lambda_{max}$ fluorescence at 524 nm in all cases. Spectra measured at room temperature. Solid line: RF, Dashed Line: CH-RF. Scored Line: RF-PMPI.

Additionally, a characterization of the absorption and emission spectra of riboflavin, the RF-PMPI derivative and the chemical conjugate was performed. It is important to know the absorption spectrum because in this way it is known what type of light the molecule absorbs to photoactivate. It absorbs in the region of blue light and UV (white and solar light have these light components present). The fluorescence spectrum is used to know in which region of the light spectrum this molecule emits light, useful for later experiments. As shown in FIGS. 4 and 5, the conjugate fluoresces less than riboflavin, this phenomenon does not affect its performance as a fungicide.

Subsequently, an additional characterization was performed in which the life-times and fluorescence anisotropy of riboflavin and riboflavin derivatives were determined. The data obtained are shown in Table 2, and these results show that highlighting riboflavin is chemically bound to the polymeric matrix of chitosan.

TABLE 2

| Life-time and fluorescence anisotropy of RF-based systems | | | | | |
|---|---|---|---|---|---|
| System | T (ns) | $\alpha_i$ | $r_0$ | $\varphi$ (ns) | $r_\infty$ |
| RF | 4.8 | | 0.278 | 0.276 | 0 |
| RF-PMPI | 1.6 | 0.033 | 0.276 | 0.374 | 0 |
| | 3.9 | 0.146 | | | |
| $CH_{H}$-RF | 1.58 | 0.046 | 0.237 | 0.485 | 0.011 |
| | 3.75 | 0.132 | | | |

Example 3

Determination of Singlet Oxygen Generation by Compounds

Figure 6:
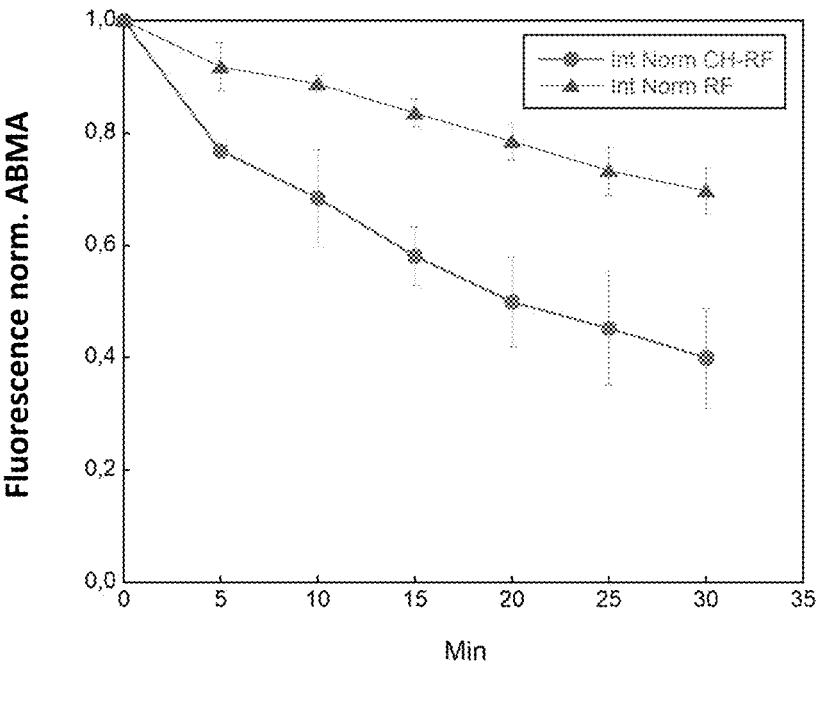
FIG. 6. Singlet oxygen generation profiles of riboflavin and chitosan conjugate. Profiles obtained by monitoring the fluorescence decrease of a oxygen-sensitive singlet acid 9.10-anthracenodiylbis(methylene)dimalonic (ABMA) probe. Samples adjusted to 0.1 u.a of absorption. Excitation wavelength at 450 nm and fluorescence tracking at 412 nm.

In this example, the capacity of singlet oxygen generation mediated by riboflavin and chitosan-riboflavin conjugate was evaluated. As shown in FIG. 6, the results obtained show that the CH-RF conjugate has a higher capacity for singlet oxygen generation than riboflavin. This result is a good indicator that the CH-RF conjugate will have a good fungicide effect.

Example 4

Quantization of Riboflavin in Conjugates

Figure 7:
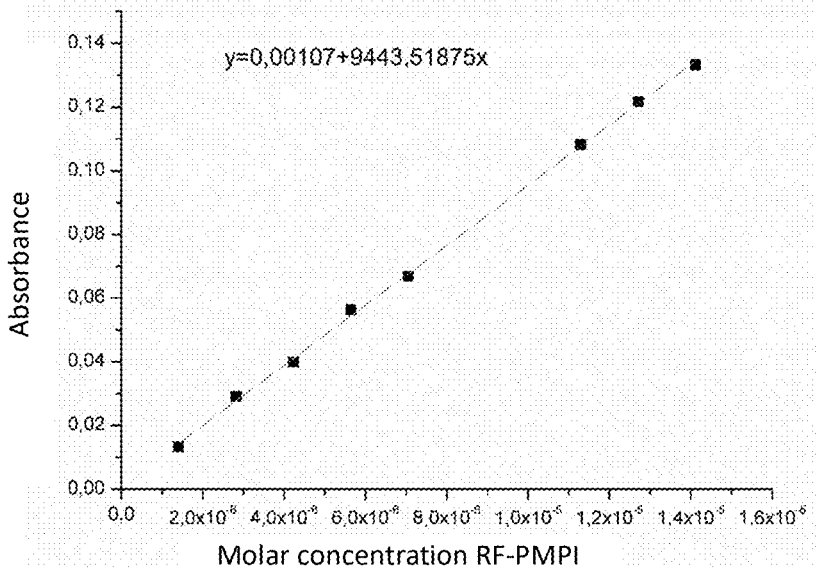
FIG. 7. RF-PMPI absorption curve A 450 nm for determination of RF content in CH-RF. Diluted RF-PMPI from DMSO concentrated solution. Conjugate (sample) measured at 0.1% m/v concentration.
Figure 8:
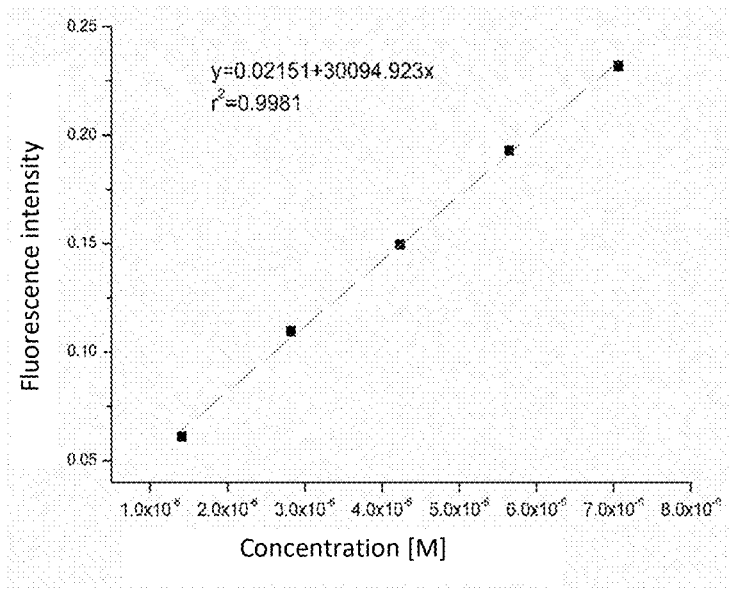
FIG. 8. Fluorescence emission curve at 524 nm RF-PMPI for determination of RF content in CH-RF. Excitation wavelength at 450 nm. Diluted RF-PMPI from DMSO concentrated solution. Conjugate (sample) measured at 0.1% m/v concentration.

The results from Table 3 and FIGS. 7 and 8 were obtained with the aim of quantifying how much riboflavin binds to chitosan in the final conjugate. A determination was made by absorption curve, by molar extinction coefficient using the Lambert-Beer Law formula and finally by fluorescence curve.

Concentrations calculated in 3 different ways are within the same order of magnitude, which is good indication that the amount of riboflavin that was achieved by chitosan is within the micromolar magnitude. Therefore, the percentage composition of the final conjugate is:

GLCN: $2.89 \times 10^{-4}$ moles, 70%
GlcNAc: $0.58 \times 10^{-4}$ moles, 14%
Thiol groups: $61.01 \times 10^{-6}$ moles, 15%
Riboflavin: $4.19 \times 10^{-6}$ moles, 1%

The conjugate possesses 1% riboflavin as a photoactive agent.

Example 5

In Vitro Fungicidal Activity of the Chitosan-Photoactive Agent Formulations

Figure 9:
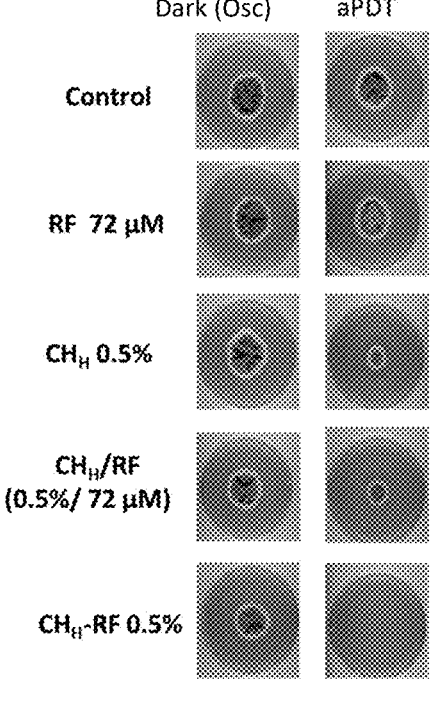
FIG. 9. Evaluation of fungicidal activity against *Penicillium digitatum* ($1\times10^4$ spores/mL) of RF, CH, CH/RF (physical mixture) and CH-RF (chemical conjugate) systems. All samples were pre-incubated for 1 hours. APDT samples were irradiated with white LED light for 1 hours. The growth of the fungus was carried to 30° C. for 7 days, on the seventh day the growth diameters were measured and the growth percentages were determined.
Figure 9:
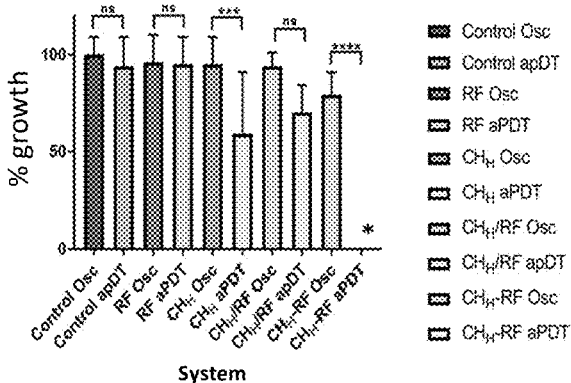

It can be seen in FIG. 9 that the conjugate is the system that has the most antifungal activity against the fruit pathogen fungus *Penicillium digitatum*. The antifungal activity of the chemical conjugate between riboflavin and chitosan is greater than that of the separate components, and it was observed that the effect is effectively enhanced when subjected to a light regime. It should be noted that this synergistic surprising activity has not been reported previously.

Figure 10:
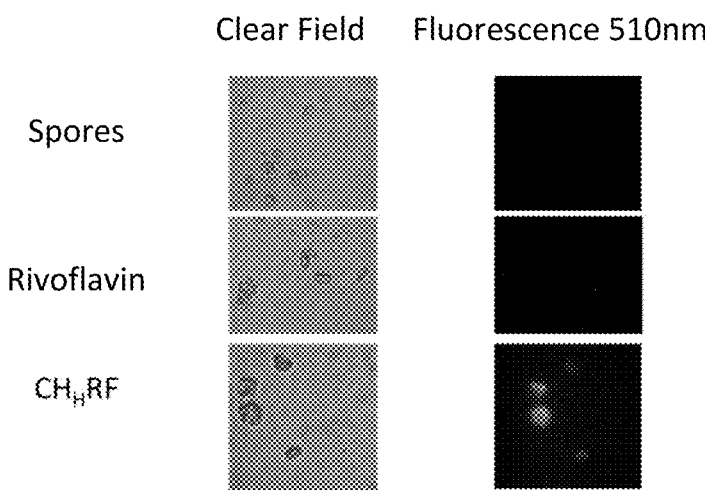
FIG. 10. Fluorescence microscopy photos of *Penicillium digitatum* spores in the presence of RF or CH-RF using 450 nm excitation light and a 510 nm fluorescence filter in 50. The same conditions of spore concentration and systems were used. 3 washes were performed with tween 20 0.1% solution prior to measurement.

Riboflavin has green fluorescence, therefore in FIG. 10 specifically it can be seen that riboflavin alone has no interaction with the spores of the fungus, whereas the conjugate does have interaction with the surface structures of the fungus, with the characteristic fluorescence of riboflavin, it can then be concluded that the chemical conjugation of riboflavin with chitosan causes this transport to the photoactive agent to the vicinity of the spore, so the photoactive effect is generated "in situ".

Figure 11:
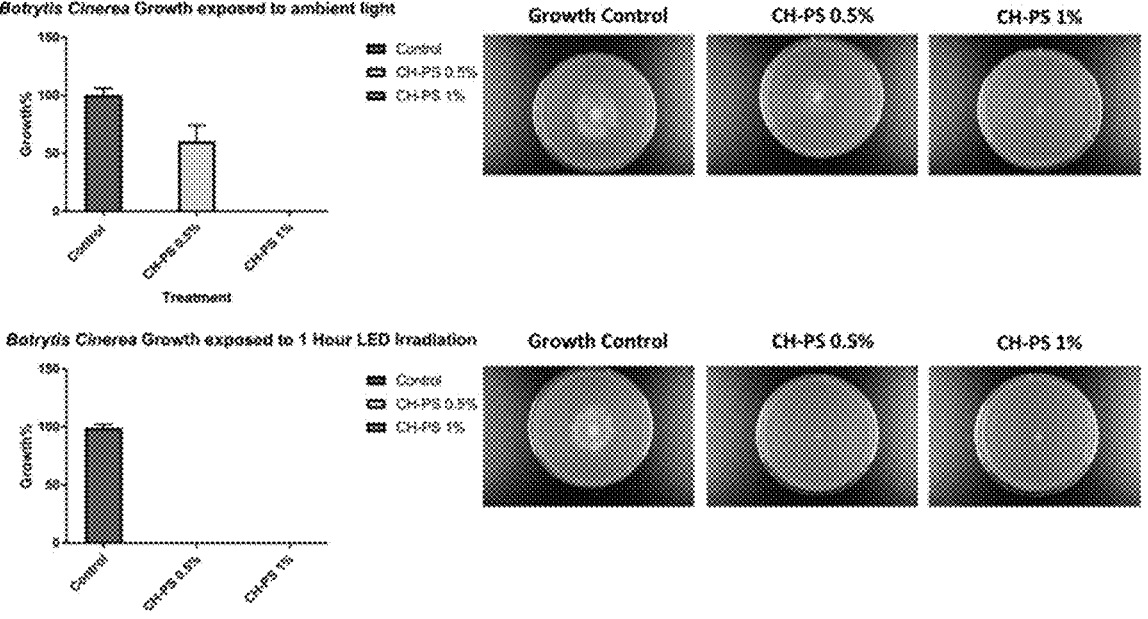
FIG. 11. Growth percentages and representative photos of CH-RF fungicide activity against *Botrytis cinerea* under new growth conditions: $1\times10^6$ spores/mL, growth with light regime of 12 hours and at 20° C. (PS stands for photosensitizer, in this case for riboflavin)
Figure 12:
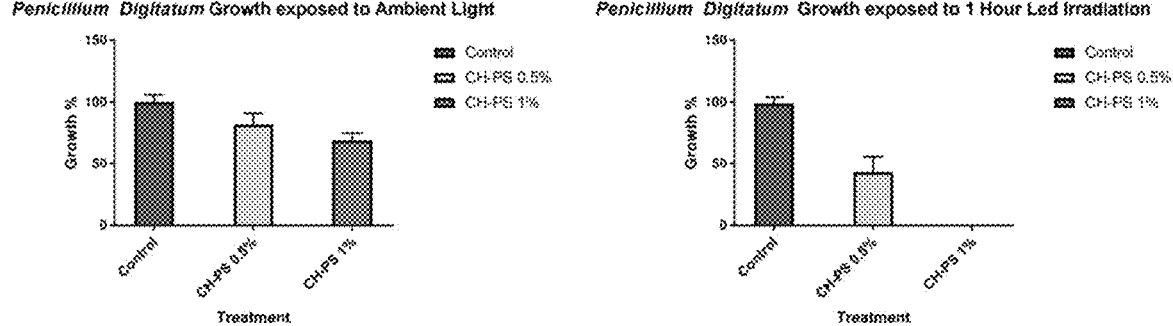
FIG. 12. Results of fungicidal activity of CH-RF against *Penicillium digitatum* under new growing conditions: $1\times10^4$ spores/mL, growth with light regime of 12 hours and at 20° C. (PS stands for photosensitizer, in this case for riboflavin)

Subsequently, tests were carried out on *Penicillium digitatum* and *Botrytis cinerea* to see the photodynamic fungicidal activity of the conjugate, under conditions closer to the industry and optimal for the growth of both pathogens (20° C., light regime 12/12, Potato Agar culture medium). The results obtained for *Botrytis cinerea* and *Penicillium digitatum* can be seen in FIGS. 11 and 12, respectively.

These new results indicate that the conjugate possesses antifungal activity against these 2 pathogens and that in both cases this antifungal effect is enhanced by light (irradiation for one hour with white LED light). In the specific case of *Botrytis cinerea*, the biofungicide eliminates 100% growth at a concentration of 1% (m/v) under ambient light, whereas, under an irradiation of 1 hours, only 0.5% in concentration of the biofungicide is needed to control 100% of the pathogen. In the case of *Penicillium digitatum*, total control is obtained with a concentration of 1% under 1 hours of irradiation.

Example 6

Control of Gray Mold (*Botrytis cinerea*) in Table Grapes

Additionally, the efficacy of the formulation developed in the present invention, which comprises the light-activable biopolymer, under more challenging conditions, was evaluated. Three treatments were used to demonstrate the technical advantages of this polymer: (1) witness with wound and inoculated with sterile water, (2) standard wound treatment and inoculated with the pathogen, and (3) treatment with the composition of the molecule described in this request to 0.7%, with wound and inoculated with the pathogen.

The berries used were obtained from a commercial orchard, which had a maturity of more than 16% of soluble solids, and these berries were collected from clusters that had never been treated with fungicides.

Berries were taken randomly from bunches with adhered pedicel, and were superficially disinfected with sodium hypochlorite at 0.5% for 1 min, followed by 95% ethanol for 30 seconds and rinsed twice with sterile distiled water, ensuring that no residue remains on the berries. They were then allowed to dry at room temperature under laminar flow chamber. The berries collected were distributed in a number of 10 berries with pedicel on metal grids in appropriately sized polyethylene boxes (e.g.: 20×15×10 cm), placing absorbent paper towel moistened with 40 ml sterile water under the grids to assemble wet chambers. The water level was adjusted depending on the size of the container.

A fixed point was punctured in each berry with a hypodermic syringe and then a 10 µl drop of $10^6$ conidia/ml *B. cinerea* suspension was mounted on the wound using a micropipette.

Subsequently, wet chambers were closed and maintained at 20° C. and relative humidity (RH)≥90% avoiding the displacement of the drop on the surface of the berry for 24 hours.

Finally, the treatments were applied (except T1), reselling chambers and arranging containers randomly in a storage chamber at 20° C. and relative humidity (RH)≥90% for 7 days. The incidence of the disease (gray mold) will be assessed 7 days after each treatment is applied.

Results:

Disease control efficiency T3>Disease control efficiency T2

Example 7

Control of Green Mold (*Penicillium digitatum*) in Citrus Fruits

An experimental strategy very similar to the previous example was used. Briefly, fruits were obtained from a commercial orchard at its point of harvest, of uniform size and color, without defects in the shell or deformations, and the fruits were not treated with fungicide prior to collection. The fruits were then disinfected with sodium hypochlorite at 0.5% for 5 minutes, followed by 95% ethanol for 30 seconds and rinsed twice with sterile distiled water, ensuring that no residue remains on the fruits. They were allowed to dry at room temperature. 12 fruits were then taken and distributed in wet polyethylene chambers of an appropriate size according to the size of the fruit. The water level under the wet chamber louvers was adjusted according to the size of the container.

A puncture was made with the tip of a scalpel not more than 3 mm deep by 3 mm wide in the equatorial area of the fruit. After the above action, the wound was inoculated with a 10 μl drop of conidial suspension of *P. digitatum* of $10^4$ conidia/ml using a micropipette.

Subsequently, wet chambers were closed and maintained at 20° C. and relative humidity (RH)≥90% avoiding the displacement of the drop on the surface of the berry for 24 hours.

Finally, the treatments were applied (except T1), reselling chambers and arranging containers randomly in a storage chamber at 20° C. and relative humidity (RH)≥90% for 7 days. The incidence of the disease (green mold) will be assessed 7 days after each treatment is applied.

It is expected that the development of patients after treatment 3 (T3) is significantly lower than the other treatments. In particular, T3 is expected to be more efficient in inhibiting disease development compared to T2.

Results: Disease control efficiency T3>Disease control efficiency T2.

The invention claimed is:

1. A fungicidal composition for inhibiting growth or combatting fungal infections of fungi of the genera *Botrytis, Penicillium*, and *Rhizopus*, the fungicidal composition comprising a biopolymer selected from the group consisting of chitosan, poly-lysine, alginate, and cellulose, conjugated to a photoactivable agent selected from the group consisting of riboflavin, porphyrins, phthalocyanins, naphthalocyanins, chlorines, phenothiazines, acridines, and 4,4-difluoro-4-bora-3a,4a-diaza-s-indacene (BODIPY), wherein the photoactivable agent generates oxygen radicals when activated by natural light.

2. The fungicidal composition of claim 1, wherein the biopolymer is at a concentration between 0.1% and 5% w/v, based on the total volume of the fungicidal composition.

3. The fungicidal composition of claim 1, wherein the biopolymer is at a concentration between 0.1% and 2.5% w/v, based on the total volume of the fungicidal composition.

4. The fungicidal composition of claim 1, wherein the photoactivable agent is at a concentration between 0.1% and 15% (w/w), based on the total weight of the biopolymer and the photoactivable agent.

5. The fungicidal composition of claim 4, wherein the photoactivable agent is at a concentration between 0.1% and 1% (w/w), based on the total weight of the biopolymer and the photoactivable agent.

6. The fungicidal composition of claim 5, wherein the biopolymer is at a concentration of 1% w/v based on the total volume of the fungicidal composition, and the photoactivable agent is at a concentration of 1% w/w, based on the total weight of the biopolymer and the photoactivable agent.

7. The fungicidal composition of claim 1, wherein the biopolymer is chitosan and the photoactivable agent is riboflavin or protoporphyrin IX.

8. The fungicidal composition of claim 1, wherein the biopolymer is chitosan and the photoactivable agent is riboflavin.

9. A method for preparing the fungicidal composition of claim 1 comprising:

a) combining the photoactivable agent (FA) with 4-maleimidophenyl isocyanate (PMPI) to obtain an FA-PMPI derivative;

b) treating the biopolymer (BP) with thioglycolic acid, 1-ethyl-3-(3-dimethylaminopropyl) carbodiimide (EDC), and N-hydroxysuccinimide to obtain a biopolymer product functionalized with reactive thiol groups (BP-SH);

c) reacting the FA-PMPI derivative and the BP-SH in an aqueous solution to obtain a conjugate product; and d) optionally, dialyzing and lyophilizing the conjugate product for storage.

10. The method of claim 9, wherein the biopolymer is chitosan and the photoactivable agent is riboflavin or protoporphyrin IX.

11. The method of claim 9, wherein, in step a), the FA is combined with the PMPI at 45° C. in nitrogen atmosphere for 24 h to obtain the FA-PMPI derivative.

12. The method of claim 9, wherein, in step c), the FA-PMPI derivative and the BP-SH are reacted in the aqueous solution at pH 6 for 24 hours to obtain the conjugate product.

13. The method of claim 9, wherein the biopolymer is chitosan and the photoactivable agent is riboflavin.

14. A method of treating or controlling gray rot, green rot, or soft rot fungal infections of a plurality of fruits or vegetables comprising contacting the fruits or vegetables with the fungicidal composition of claim 1.

15. The fungicidal composition of claim 14, wherein the biopolymer is chitosan and the photoactivable agent is riboflavin or protoporphyrin IX.

16. The fungicidal composition of claim 14, wherein the biopolymer is chitosan and the photoactivable agent is riboflavin.

17. A method of treating or preventing-controlling fungal infections caused by *Botrytis cinerea, Penicillium digitatum*, and/or *Rhizopus stoloniser* of a plurality of fruits or vegetables comprising contacting the fruits or vegetables with the fungicidal composition of claim 12.

* * * * *